United States Patent [19]

Arroyo et al.

[11] Patent Number: 4,909,592
[45] Date of Patent: Mar. 20, 1990

[54] COMMUNICATION CABLE HAVING WATER BLOCKING PROVISIONS IN CORE

[75] Inventors: Candido J. Arroyo, Lithonia; Paul F. Gagen, Duluth, both of Ga.

[73] Assignee: American Telephone and Telegraph Company, AT&T Bell Laboratories, Murray Hill, N.J.

[21] Appl. No.: 250,897
[22] Filed: Sep. 29, 1988
[51] Int. Cl.⁴ .............................................. G02B 6/44
[52] U.S. Cl. ................................ 350/96.23; 174/23 C
[58] Field of Search .................. 350/96.23; 174/23 R, 174/23 C

[56] References Cited

U.S. PATENT DOCUMENTS

| | | | |
|---|---|---|---|
| 2,316,129 | 4/1943 | Bock | 531/60 |
| 3,425,971 | 2/1969 | Gugliemelli et al. | 535/54.32 |
| 3,509,269 | 4/1970 | Elliot | 174/120 |
| 3,538,235 | 11/1968 | Arendt et al. | 174/23 C |
| 3,661,815 | 5/1972 | Smith | 260/17.4 |
| 3,803,339 | 4/1974 | Speekman | 174/23 C |
| 3,849,361 | 11/1974 | Zweigle | 260/33.2 R |
| 3,954,721 | 5/1976 | Gross | 526/14 |
| 4,002,819 | 1/1977 | Woytiuk | 174/23 C |
| 4,059,552 | 11/1977 | Zweigle et al. | 260/29.6 TA |
| 4,172,066 | 10/1979 | Zweigle et al. | 260/29.6 TA |
| 4,241,979 | 12/1980 | Gagen et al. | 350/96.23 |
| 4,260,443 | 4/1981 | Lindsay et al. | 156/220 |
| 4,282,121 | 8/1981 | Goodrich . | |
| 4,366,205 | 12/1982 | Tanaka | 428/373 |
| 4,366,294 | 12/1982 | Williams et al. | 525/327.6 |
| 4,401,366 | 8/1983 | Hope | 350/96.23 |
| 4,596,443 | 6/1986 | Diemeer et al. | 350/96.23 |
| 4,599,379 | 9/1986 | Flesher et al. | 524/801 |
| 4,622,263 | 11/1986 | Ando et al. | 428/288 |
| 4,649,164 | 3/1987 | Scott et al. | 521/149 |
| 4,701,015 | 10/1987 | Saito et al. | 350/96.23 |
| 4,701,016 | 10/1987 | Gartside, III et al. | 350/96.23 |
| 4,703,997 | 11/1987 | Ijiri et al. | 350/96.23 |
| 4,703,998 | 11/1987 | Uchioke et al. | 350/96.23 |
| 4,765,712 | 8/1988 | Gohannon, Jr. et al. . | |
| 4,770,489 | 9/1988 | Saito et al. | 350/96.23 |
| 4,787,702 | 11/1988 | Khalil | 350/96.23 |
| 4,802,732 | 2/1989 | Fukuma et al. | 350/96.23 |

OTHER PUBLICATIONS

"A Highly Effective Approach to Waterproofing Cable" authored by H. Hughes, et al., 1984 International Wire and Cable Symposium.
"A Newly Developed Water Blocking Fiber Optic Cable" Appearing in the Sumitomo Electric Technical Review, No. 20, Jan., 1987, authored by N. Nirasawa.
B. J. Nieuwhof, "Longitudinal Waterblocking Performance of Conductive and Non Conductive Waterswellable Nonwovens", International Wire & Cable Symposium, 1983.
Firet Brochure, "Waterblocking, A Dutch Speciality," DuPont Technical Information Brochure, Reemay ®.
Djock, J. C.; Klem, R. E., "Review of Synthetic and Starch-Graft Copolymer Superabsorbents", Insight '83 Absorbent Products Conference, Nov. 16–17, 1983.
"Lanseal-F" Super Absorbent Fiber Brochure, Chori America, Inc., on behalf of Japan Exlan Co. Ltd.
FIRET Brochure, "Problem Solutions for Industrial Applications Non-Woven Tapes for the Cable Industry".

Primary Examiner—William L. Sikes
Attorney, Agent, or Firm—Edward W. Somers

[57] ABSTRACT

A communications cable comprising a core of transmission media such as optical fibers, for example, disposed in a core tube and a sheath system (32) includes provisions for preventing the movement of water within the cable core. Water blocking provisions (26) are disposed in the core tube and may comprise a tape or a yarn, for example, or both. The tape may comprise substrate tapes between which is disposed a superabsorbent material in powder form which upon contact with water swells and inhibits the further movement of the water. In another embodiment, a water swellable yarn may extend longitudinally linearly with the optical fibers in the core. The water blocking provisions and the ratio of the sum of the cross sectional areas of the optical fibers and of the water blocking provisions and of any other cable element within the core to the area within the core tube are such that the transmission media in the core are decoupled substantially from the sheath system in at least one direction transverse of the longitudinal axis of the cable. On the other hand, the transmission medium is coupled sufficiently to the sheath system in the longitudinal direction to cause the transmission medium substantially to be moved with the sheath system when pulling forces are applied to the cable.

33 Claims, 5 Drawing Sheets

COMMUNICATION CABLE HAVING WATER BLOCKING PROVISIONS IN CORE

TECHNICAL FIELD

This invention relates to a communications cable having water blocking provisions in a core of the cable. More particularly, it relates to a communications cable which includes facilities in a cable core for preventing the passage of water through the core of the cable and the longitudinal migration of water along the interior of the cable.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable.

Furthermore, water may enter the cable because of damage to the cable which compromises its integrity. For example, rodent attacks or mechanical impacts may cause openings in the sheath system of the cable to occur, allowing water to enter, and, if not controlled, to move longitudinally along the cable into splice closures, for example.

Lately, optical fiber cables have made great inroads into the communications cable market. Although the presence of water itself within an optical fiber cable is not necessarily detrimental to its performance, passage of the water along the cable interior to connection points or terminals or associated equipment inside closures, for example, may cause problems especially in freezing environments and should be prevented.

Cables for transmitting communications signals must meet industry standards with respect to water blocking provisions. For example, one industry standard requires that there be no transmission of water under a pressure head of one meter in one hour through a one meter length of cable.

In the prior art, various techniques have been used to prevent the ingress of water through the sheath system of a cable and along the core. For example, a metallic shield which often times is used to protect a metallic conductor cable against lightning and rodent attacks is provided with a sealed longitudinal seam. Forming of a shield about a cable core requires the use of relatively low manufacturing line speeds. Also, the use of a metallic shield is destructive of the otherwise all-dielectric property of an optical fiber cable.

Because lightning strikes may cause holes in a metallic shield, it is not uncommon to include additional provisions for preventing the ingress of water into the core. Water blocking materials have been used to fill cable cores and to coat portions of cable sheath systems to prevent the movement longitudinally thereof of any water which enters the cable. Although the use of a filling material, in the form of a grease, causes housekeeping problems, inhibits line speeds because of the need to fill carefully interstices of the cable core and presents problems for field personnel during splicing operations, for example, it continues to be used to prevent entry of the water into the core.

Presently, many commercially available cables also include a water swellable tape. The tape is used to prevent the travel of water through the sheath system as well as its travel longitudinally along the cable to closures and termination points, for example. Such a tape generally is laminated, including a water swellable powder which is trapped between two non-woven tissues. Although such a tape provides suitable water protection for the cable, it is relatively expensive and thick. If the tape is too thick, the diameter of the cable is increased, thereby causing problems in terminating the cable with standard size hardware.

The problem of cable size caused by bulky tapes has been overcome. In U.S. patent application Ser. No. 115,123 which was filed on Oct. 30, 1987 in the name of C. J. Arroyo, U.S. Pat. No. 4,867,526, a cable having water blocking provisions is disclosed. Interposed between a core and a jacket is an elongated substrate member which comprises an impregnated non-metallic, non-woven, web-like material in the form of a tape. The tape material is relatively compressible and has sufficient porosity to permit entry of sufficient impregnating material so that it provides enhanced water blocking capability. The impregnating material may comprise a film of a water swelling or so-called superabsorbent material.

In another prior art cable, a water blocking yarn is interposed between a core tube and an outer surface of a jacket of the cable's sheath system. The yarn extends linearly along the cable or may be wrapped helically about a portion of the sheath system. The yarn may be one which is composed of a superabsorbent fiber material which upon contact with water swells and inhibits the movement of water within the cable.

Although the foregoing arrangements provide excellent water blocking capabilities, they generally have been used to supplement a composition of matter such as a jelly-like grease, for example, which fills the core. These compositions of matter are somewhat messy to apply and require a cleaning agent such as a solvent to remove the filling compound to facilitate splicing. Also, care must be taken so that these agents do not affect adversely coloring material or coating material on the fiber. What is sought after is a cable in which the core is not filled with a grease-like material but rather includes other provisions for blocking water flow along the core.

The prior art also includes a cable in which the core is water blocked without resort to jelly-like filling materials. For example, disclosed in an article from the Sumitomo Electric Technical Review is a centrally disposed strength member which has a plurality of optical fibers arrayed thereabout. Water blocking string is disposed in interstices between the fibers and the strength member and a water blocking yarn is disposed between the fibers and a water blocking tape disposed in engagement with a core tube. Also in a brochure of Lopp-Textrina AG, which appears to have a publication date of Jan. 1, 1988, a communication cable includes copper wires having a centrally disposed water swelling yarn and a swelling non-woven is disposed between the copper conductors and a casing. The foregoing alternatives to a core filled with a filling compound may not be the most cost-effective, may not result in optimum space efficiency and may be restricted in their application to particular cable designs such as stranded cable.

Another consideration in the design of optical fiber cables is one which relates to coupling of the optical fibers within the core to the cable sheath system. Of course, the fiber should be suitably coupled in a longitudinal direction to the cable sheath system so that when pulling forces are imparted to the cable, the fibers except perhaps along a relatively short end portion will move with the sheath system. However, in order to avoid unacceptably high microbending losses and/or to mitigate stresses, the optical fibers should be decoupled from the sheath system in at least one direction transverse of the cable.

What the prior art appears to lack is a cable in which a core of the cable is provided with a simple water blocking arrangement instead of multiple provisions which require additional manufacturing steps and expense. Such a sought-after arrangement should be one in which the optical fibers are decoupled substantially from the sheath system in at least one direction transverse of the cable.

SUMMARY OF THE INVENTION

The foregoing problems of the prior art have been overcome by cables of this invention. A cable of this invention includes a core which may include optical fibers or metallic conductors. The cable also includes a core tube which encloses the core and a plastic jacket which encloses the core tube. Water blocking provisions inside the core tube are such that the optical fibers in the core are decoupled substantially from the sheath system in at least one direction transverse of a longitudinal axis of the cable. The arrangement is such that the optical fibers are coupled sufficiently to the sheath system in a longitudinal direction to cause the fibers substantially to be moved with the sheath system when pulling forces are applied to the cable.

A longitudinally extending water blocking member inside the core tube may take several forms. For example, it may comprise a laminate comprising a powder captured between two tapes. Or, it may comprise a substrate tape which is impregnated with a material which is held in a non-woven, web-like tape in suspension without its being reacted. When exposed to water, the impregnating material reacts to swell and cause the tape to prevent the passage of water through the sheath system toward the core and its migration in a direction longitudinally along the cable. In one embodiment, the impregnating material comprises a film of a water swelling or so-called superabsorbent material. In another embodiment, a tape may be treated with a paste comprising a superabsorbent material. The impregnating material may be polyacrylic acid having a saponification in a relatively wide range or it may be a polyacrylamide. Also, the impregnating material may comprise blends or salts of polyacrylic acid or polyacrylamide, or copolymers or derivatives of the acrylic acid and the acrylamide. Also, the water blocking provisions within the core may comprise one or more yarns such as KEVLAR ® yarn, for example, which have been impregnated with a superabsorbent material or which comprise superabsorbent fibers. Also, the water blocking provisions in the core may comprise a water blocking tape, which may engage an inner surface of the core tube, and a water blocking yarn or yarns.

Further, the cable of this invention may include supplementary water blocking members disposed outside the core. A water blocking tape may be disposed between the core tube and the jacket. In alternative, yarns such as KEVLAR ® yarn which have been impregnated with a water blocking material may be wrapped about the core tube. A cable which includes a strength member yarn which has been impregnated with a water blocking material has been disclosed in U.S. application Ser. No. 217,486 which was filed on Jul. 11, 1988 in the names of C. J. Arroyo, et al.

BRIEF DESCRIPTION OF THE DRAWING

Other objects and features of the present invention will be more readily understood from the following detailed description of specific embodiments thereof when read in conjunction with the accompanying drawings, in which.

DETAILED DESCRIPTION

Figures 1, 2:
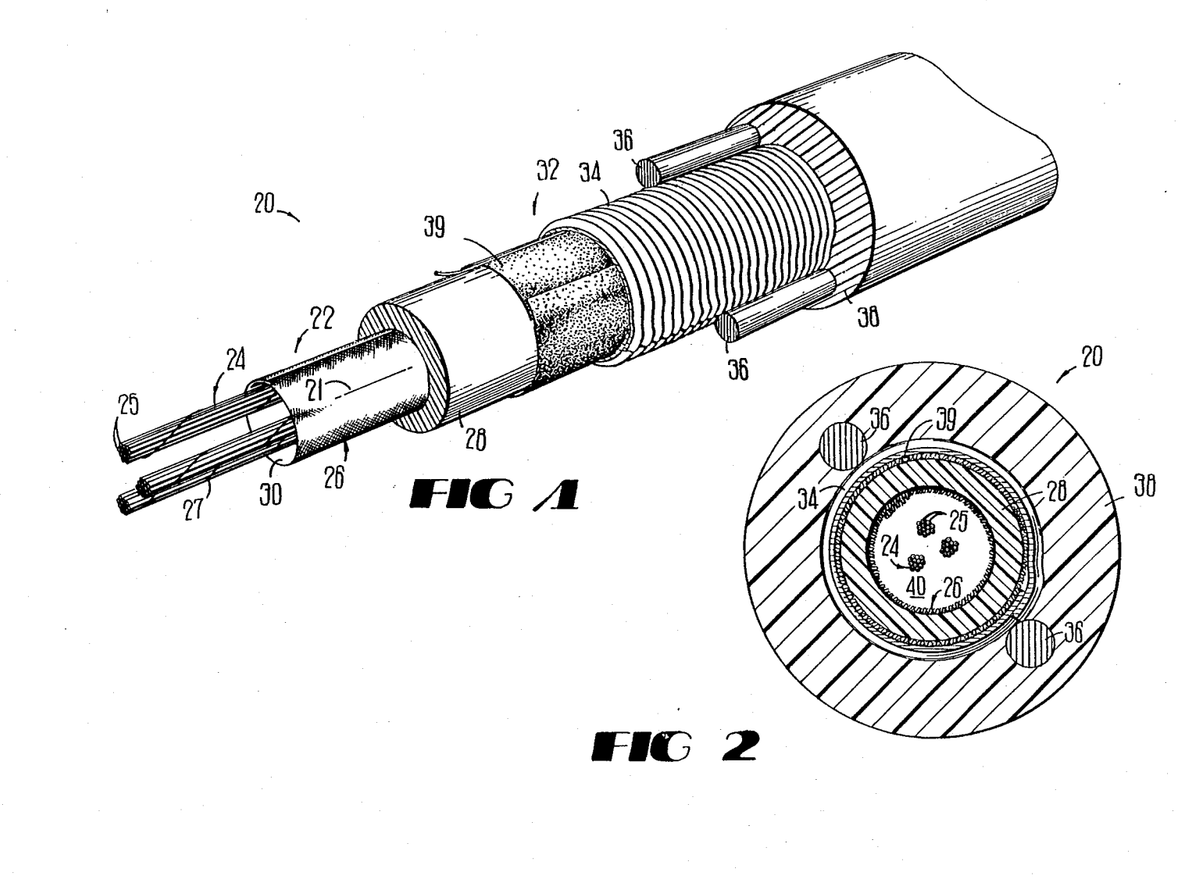
FIG. 1 is a perspective view of a communications cable having a core which includes a water blocking member with various layers of the sheath system broken away and some of the layers exaggerated in thickness for purposes of clarity.
FIG. 2 is an end sectional view of the cable of FIG. 1 which illustrates some elements of the cable in greater detail.

Referring now to FIGS. 1 and 2, there is shown a communications cable which is designated generally with the numeral 20 and which has a longitudinal axis 21. It includes a core 22 comprising one or more units 24—24 of optical fibers 25—25 which may be buffered with an outer layer of polyvinyl chloride (PVC), for example. Each of the units 24—24 is wrapped with a binder ribbon 27. The core 22 includes a water blocking member 26 which is disposed within a core tube 28 of a sheath system 32. In the embodiment shown, the water blocking member 26 is tubular and disposed adjacent to the core tube 28.

The water blocking member 26 in one embodiment is in the form of a tape 30 which may comprise a substrate tape which may be made of a hydrophobic material and which has been treated with a water blocking material. Advantageously, the treated tape is hydrophilic. A hydrophilic material is one that has a strong affinity for water in that it absorbs water easily. As can be seen, the tape 30 has been wrapped about the units 24—24 in a manner which may or may not include an overlapped seam.

The core tube 28 is enclosed by a metallic shield 34 and an outer plastic jacket 38. The sheath system 32 also includes two diametrically opposed strength members 36—36. Also, an additional tape 39 may be wrapped about an outer surface of the core tube 28. The tape 39 is a water blocking tape which may be the same as the tape 30.

In one embodiment, the tape 30 is a spunbonded nonwoven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material which has the capability of maintaining its shape in the presence of the temperatures encountered during the extrusion of the core tube 28. The fibers of the web structure are arranged so that air cells or pockets are formed.

A polyethylene terephthalate fiber product, formed into a web structure as described above has been identified under the registered trademark "Reemay" by the E. I. du Pont de Nemours and Company, Incorporated of Wilmington, Del. Presently, the Reemay® web structure is available in various thicknesses and densities from Reemay, Inc. of Old Hickory, Tenn. The properties of Reemay tapes are further defined and described in Bulletin R-1, dated Mar., 1986, entitled "Properties and Processing of Reemay Spunbonded Polyester" from E. I. du Pont de Nemours and Company, Incorporated, Wilmington, Del.

Although in a preferred embodiment, a spunbonded polyester tape is used, others also are acceptable. For example, the tape which is to be impregnated may be nylon spunbonded fabric, non-woven glass, polypropylene melt blown non-woven fabric, polyurethane spunbonded fabric or TCF cellulose fabric, for example.

Advantageously, the tape 30 of this invention also acts as a thermal barrier not only during the extrusion of the core tube 28 but also during the extrusion of the jacket 38. As the jacket 38 is extruded over the shield 34, heat is available for transfer into the optical fiber core. The tape 30 of the cable 20 has the ability to insulate against the heat caused by the extrusion of the core tube and the jacket.

Another important characteristic of the substrate tape is the stiffness of the body of the material which comprises the tape. Within limits, as the material of the substrate tape is made increasingly stiffer, it is still relatively easy to form the tape longitudinally about the units 24—24, without wrinkling. However, it is important that the material have sufficient memory so that it tends to spring outwardly into engagement with the inner surface of the core tube 28. As a desirable consequence, a minimum overall diameter is achieved for the cable which will meet all the necessary requirements.

Stiffness of the material for the substrate tape is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to decrease the ability of the material to prevent heat transfer. Thus, at least four factors, formability of the tape 30, cost of the tape, insulative capability of the tape, and its water blocking capability must be considered and balanced in providing the proper material for use on a particular cable.

In one embodiment, the spunbonded polyester tape combines the thermal, chemical and mechanical properties of polyester fibers with a spunbonded structure to provide a tape which is suitable for use in a communications cable. These properties include a relatively high tensile strength and elongation, excellent tear strength, and resistance to temperatures as high as about 450° F.

In order to render the substrate tape swellable upon contact with moisture, the substrate tape is impregnated with a suitable water swellable material which herein is referred to as a superabsorbent material.

Superabsorbents are hydrophilic materials which can absorb and retain water without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent discloses saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes- polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

A spunbonded tape 30 may be impregnated with any of several water blocking superabsorbent materials. In one embodiment, it is impregnated with a superabsorbent material which is derived from an aqueous solution comprising acrylate polymeric material which combines acrylic acid and sodium acrylate functionalities and water.

The impregnating material of the one embodiment comprises a sodium salt of polyacrylic acid in which all the carboxylic groups may or may not be reacted with sodium. In other words, it is saponified in whole or in part. The level of saponification which may fall within a relatively wide range depends on desired properties. After the tape 30 has been impregnated, the superabsorbent material is dried to provide a film on the tape. The impregnated tape 30 has a density of about 1.1 to 1.8 ounces per square yard which includes the density of the untreated tape increased 10 to 80%, i.e. the add-on, by the treating material.

In another embodiment, a Reemay spunbonded polyester tape is impregnated with an aqueous solution comprising acrylates and acrylamide polymer powders mixed with water. The tape impregnated with such a composition has a density which may represent an increase as high as about 80% of the density of the untreated tape. In each of the embodiments just described, the impregnating material is a mixture of water or other liquid media and a superabsorbent material in which the mixture comprises about 4 to 24% solids when the impregnating material is an aqueous solution and applied.

In general, the tape 30 may be impregnated with (1) a material comprising polyacrylic acid, or (2) a material comprising polyacrylamide or (3) blends of (1) and (2) or salts thereof or (4) copolymers of acrylic acid and acrylamides and salts thereof as well as other similar superabsorbents.

Advantageously, in response to contact with water, the superabsorbent material in a cable structure swells to block the flow of water including that in a longitudinal direction. The superabsorbent material also forms a gel and changes the viscosity of the ingressed water at the point of contact with superabsorbent material, making it more viscous and consequently developing more resistance to water flow. As a result, the cable of this invention is able to meet industry standards with respect to the flow of water longitudinally along the cable from a point of entry.

The substrate tape of an impregnated tape 30 also possesses specific properties such as porosity and thickness which enhance its use as a water blocking element for a cable, particularly for communications cable. Of importance is the need for the tape to be made of a material which has a relatively high porosity. It has been found that the water swellability of the substrate tape increases as the porosity of the tape increases. Porosity may be measured by air permeability in units of cubic feet per minute at a specified water pressure. At 0.5 inch of water pressure, typical porosities are in the range of about 120 to 1000 cfm/ft$^2$.

Evidently, because a Reemay tape is so porous and hence substantially cellular in structure, the tape is capable of accepting a substantial quantity of the impregnating material. As a result, entering water contacts a substantial area of the impregnating material which is water blocking. There is a surprisingly fast reaction between the water blocking material and the water causing the water blocking material to swell and block off further longitudinal movement of the water along the cable.

The porosity of the untreated substrate tape decreases with increasing thickness. In one embodiment, the Reemay tape is style 2014 which at 0.5 inch of water has a porosity of 800 cfm/ft$^2$. Reemay tape marketed under code designation 2014 has a density of 1.0 ounce per square yard, has a thickness of 0.008 inch and is formed of substantially straight polyethylene terephthalate fibers. Reemay tape having a code designation of 2024 has a density of 2.1 ounces per square yard, has a thickness of 0.012 inch, has a porosity of 350 cfm/ft$^2$ at 0.5 inch H$_2$O and also is formed of substantially straight polyethylene terephthalate fibers. Reemay tape having a code designation of 2415 has a density of 1.15 ounces per square yard, has a thickness of 0.014 inch, has a porosity of 700 cfm/ft$^2$ at 0.5 inch H$_2$O and is formed of crimped polyethylene terephthalate fibers.

Obviously, various other grades and thicknesses of Reemay spunbonded polyester tape or other similar materials may be used. Material densities of up to about 2 ounces per square yard are practical values. Practical material thickness may range from 0.005 inch to 0.012 inch thick. These values by no means limit the invention but represent the presently preferred ranges.

Although the porosity of the substrate tape is relatively high, that of the impregnated tape, if any, is relatively low. As a result, if the tape 39 is disposed adjacent to the cable jacket with no shield therebetween, bleed-through of the molten jacket plastic does not occur.

The porosity of the substrate tape of an impregnated tape 30 must be balanced against other properties. For example, because the tape is to be embodied in a cable, it is beneficial for the tape to have a relatively high tensile strength. For a given tape width, the tensile strength decreases as the thickness decreases. Although a larger thickness is desired insofar as tensile strength is concerned, a larger thickness may result in less porosity, at least for those tapes which are available commercially. Therefore, these two properties must be balanced against each other to arrive at a final thickness. As mentioned hereinbefore, the style 2014 preferred Reemay tape has a thickness of 0.008 inch which is suitable for use in the cables of this invention.

Thickness of the tapes 30 and 39 also is important from another standpoint. In order to allow the cable to be terminated by standard size hardware, the diameter of the cable must be maintained within a desired range. Accordingly, the thickness of each element of the sheath system must be considered. Therefore, the thickness is established while being mindful of the porosity and the tensile strength. The tape must not be too thin, else the tensile strength is affected adversely, and if too thick, the porosity and overall cable outside diameter are affected adversely.

In a preferred embodiment, the water blocking member in the form of a tape 30 is a laminate. The laminate comprises two cellulosic tapes which are non-woven and which contain a superabsorbent powder material therebetween. The superabsorbent powder may be made of the superabsorbent materials described hereinbefore with respect to the impregnated tape. A laminate is preferred because of the relatively fast response, that is, a relatively high swellable rate of rise which it exhibits when contacted by moisture.

The water blocking provisions in the tape form inside the core tube 28 exhibit a dual function. The water blocking tape 30 is disposed adjacent to the core tube 28 with the optical fibers being disposed within the core. First, they block the migration of water radially inwardly toward the transmission media within the core. Secondly, they prevent substantially the longitudinal migration of water along the cable into splice cases, for example.

The structural arrangement of the cable of this invention provides still another advantage. The transmission media such as the optical fibers are decoupled substantially from the core tube and hence from the sheath system in at least one direction transverse of the longitudinal axis of the cable. On the other hand, the transmission media are coupled sufficiently to the sheath system in the longitudinal direction to cause the transmission media to be moved with the sheath system when pulling forces are applied to the cable. Of course, it should be realized that this is interpreted to mean substantially all the length of the media moves with the sheath system; there may be a short length adjacent to the end of the cable which becomes withdrawn within the jacket when pulling forces are applied to the cable.

Decoupling is accomplished by causing the water blocking provisions and other elements within the core tube to be arranged so that intentional voids 40—40 are provided in the core. This contrasts with prior art cables wherein the core is essentially filled completely with combinations of optical fibers and water blocking or other kinds of yarn.

Figures 3, 4:
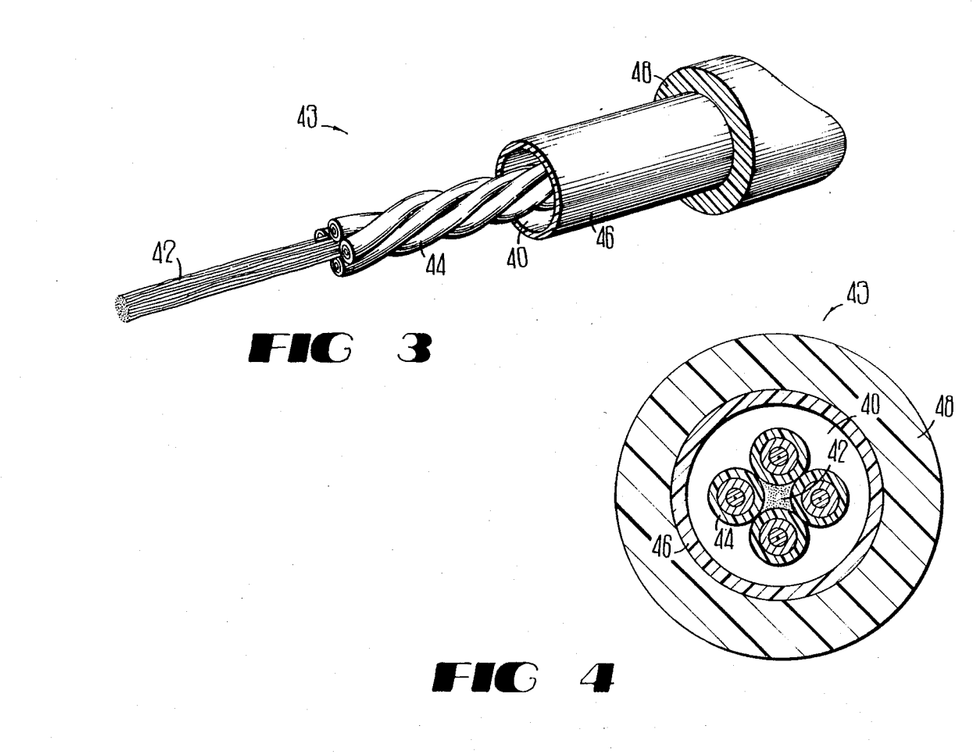
FIGS. 3 and 4 are perspective and end sectional views of another embodiment of the cable of this invention.

Other elements which may be included in the core are centrally disposed yarns such as a yarn 42 of a cable 43 shown in FIGS. 3 and 4. The yarn 42 may be an impregnated KEVLAR yarn, for example, with a plurality of buffered optical fibers 44—44 arranged thereabout. The yarn and the optical fibers are enclosed in a core tube 46 and a plastic jacket 48. In this embodiment, the optical fibers are stranded. The fibers and the yarn and the core tube are such that substantial intentional voids 40—40 are provided within the core tube.

What is important is that the ratio of the cross sectional area of elements within the core tube to the transverse cross sectional area of the core tube be less than a predetermined value. In other words, the sum of the cross sectional areas of the optical fibers and of the water blocking tape and/or yarn, for example, and of any other elements within the core tube to the area bounded by the core tube does not exceed a value which allows substantial transverse movement of the optical fibers within the core tube.

It is important in the kind of cable structure disclosed herein to allow optical fibers which on bending of the cable are disposed on the tension side of the bending axis to move at least substantially to the neutral axis of bending to mitigate stresses in the fibers. Of course, the fibers may move farther into the portion of the cable under compression in bending. In other words, because of the intentional provision of substantial voids, the optical fibers are allowed to undergo substantial transverse movement within the core tube 28.

In one embodiment, the ratio of the sum of the cross-sectional areas of all the optical fibers in the core tube 28 to the cross-sectional area defined by the inner wall of the core tube does not exceed a predetermined value of about 0.5. This control of this area ratio helps to insure that the media within the core are decoupled from the sheath system in the transverse direction to avoid microbending of the optical fibers and to mitigate stresses imparted to the optical fibers while not impairing coupling to the sheath system in a longitudinal direction.

The decoupling through the arrangement of intentional voids and control of the above-described area ratio allows substantial motion of the transmission medium in at least one transverse direction when the cable is stressed such as by bending of the cable. In effect, this allows a degree of freedom for the transmission media which mitigates against the stress imparted to the media for a given stress or deformation imparted to the cable system.

Figures 5, 6:
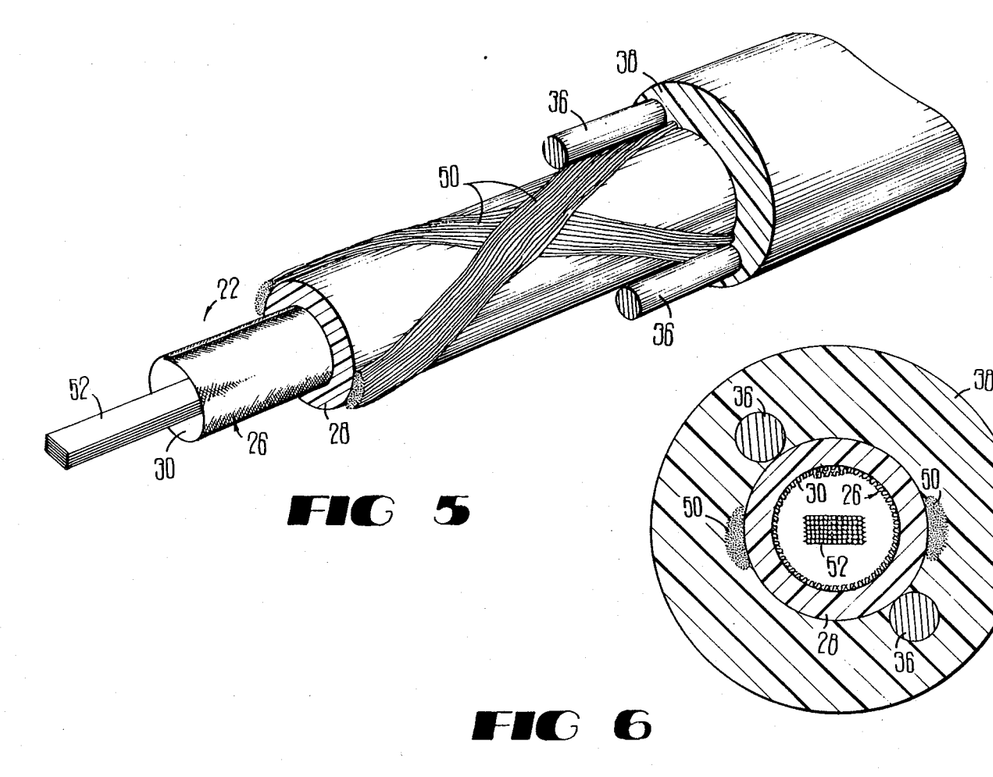
FIG. 5 is a perspective view of another embodiment of the cable of FIG. 1.
FIG. 6 is an end section view of the cable of FIG. 5.

In another embodiment shown in FIGS. 5 and 6, the water blocking member external to the core tube 28 may comprise yarns 50—50 each of which extends helically or linearly along the cable. See U.S. application Ser. No. 115,459 which was filed on Oct., 30, 1987 in the names of C. J. Arroyo, H. P. Debban, and W. L. Paucke, now U.S. Pat. No. 4,815,813. It should also be observed from FIG. 6 that the core may comprise a plurality of optical fiber ribbons 52—52 each comprising a planar array, for example, of the optical fibers 25—25.

Each yarn may be a 3183 denier yarn, for example, which has been treated with a water swellable material or made from water swellable fiber. Such a yarn is disclosed in U.S. Pat. No. 4,366,206 which is incorporated by reference hereinto. Yarn suitable for use is manufactured by Japan Exlan Co., Ltd. of Osaka, Japan, under the trade designation "LANSEAL-F" superabsorbent fiber and is available commercially from Chori America, Inc. Obviously, a single yarn extending longitudinally of the cable in linear or helical fashion detracts very little from any desired bond between the jacket and any underlying element.

The yarn may extend or be wrapped helically about the cable core tube 28 so that each helically wound yarn crosses periodically the linearly extending strength members 36—36. In the alternative, the yarn may extend linearly or be wound helically in an opposite direction from that of strength members which may be helically wound.

Figures 7, 8:
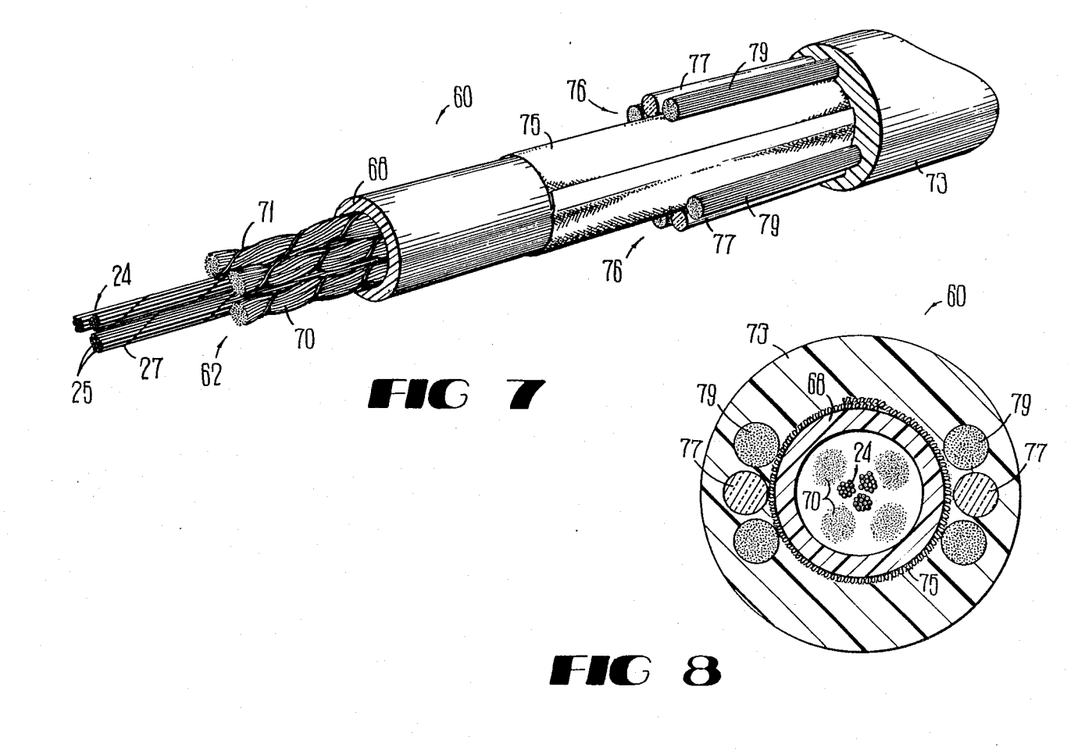
FIGS. 7-8 are perspective and end sectional views of another embodiment of the inventive cable which includes a water blocking yarn system within its core.

Going now to FIGS. 7 and 8, there is shown a cable which is designated generally by the numeral 60. The cable 60 includes a core 62 which comprises one or more of the units 24—24 each comprising a plurality of optical fibers 25—25 which in a preferred embodiment extend linearly without intended stranding. The optical fiber units 24—24 are enclosed by a core tube 68 which may be made of a plastic material.

Disposed within the core tube 68 are a plurality of water blocking members 70—70. Each of the water blocking members 70—70 may be a yarn 50 such as that described previously with respect to the cable of FIG. 5. Each water blocking member 70 may be provided with a binder ribbon 71 to maintain intact the fibrous material of the yarn.

Further as can be seen in FIGS. 7 and 8, the core tube 68 is enclosed by a jacket 73 which comprises a plastic material. Interposed between an outer surface of the core tube 68 and the jacket 73 may be a water blocking member 75 which supplements the water blocking tape or yarn within the core. The water blocking member 75 may comprise a laminate of two non-woven tapes with a powder therebetween as in the preferred embodiment of the cable of FIGS. 1 and 2 or it may comprise a tape which has been impregnated with a superabsorbent material or it may comprise impregnated yarn or yarn comprised of superabsorbent material. Should only water blocking yarn be used, the yarn or yarns is effective to block the longitudinal flow of water and after swelling also block the movement of water radially inwardly.

Further of importance is the type of yarn if any which is used. Desirably, it is such that it is compressible. This contributes to the freedom of movement for the media in at least one transverse direction.

The cable 60 also includes a strength member system which may comprise diametrically opposed pluralities 76—76 of longitudinally extending strength members. Each plurality 76 may comprise non-metallic members one of which is designated 77 and may be relatively stiff whereas each of the others of the plurality is designated 79 and is relatively flexible.

The inventive arrangement contrasts with prior art arrangements in which an optical fiber core is filled substantially completely with yarn between the fibers and a core tube. Seemingly, the prior art arrangements will result in at least some coupling of the optical fibers to the core tube in the transverse direction thereby preventing substantial movement in a transverse direction if the cable is stressed such as in bending. In the cable of this invention, there are substantial voids between the optical fibers and the core tube which intentionally are caused to occur and which mitigate against coupling in the transverse plane.

Figures 9, 10:
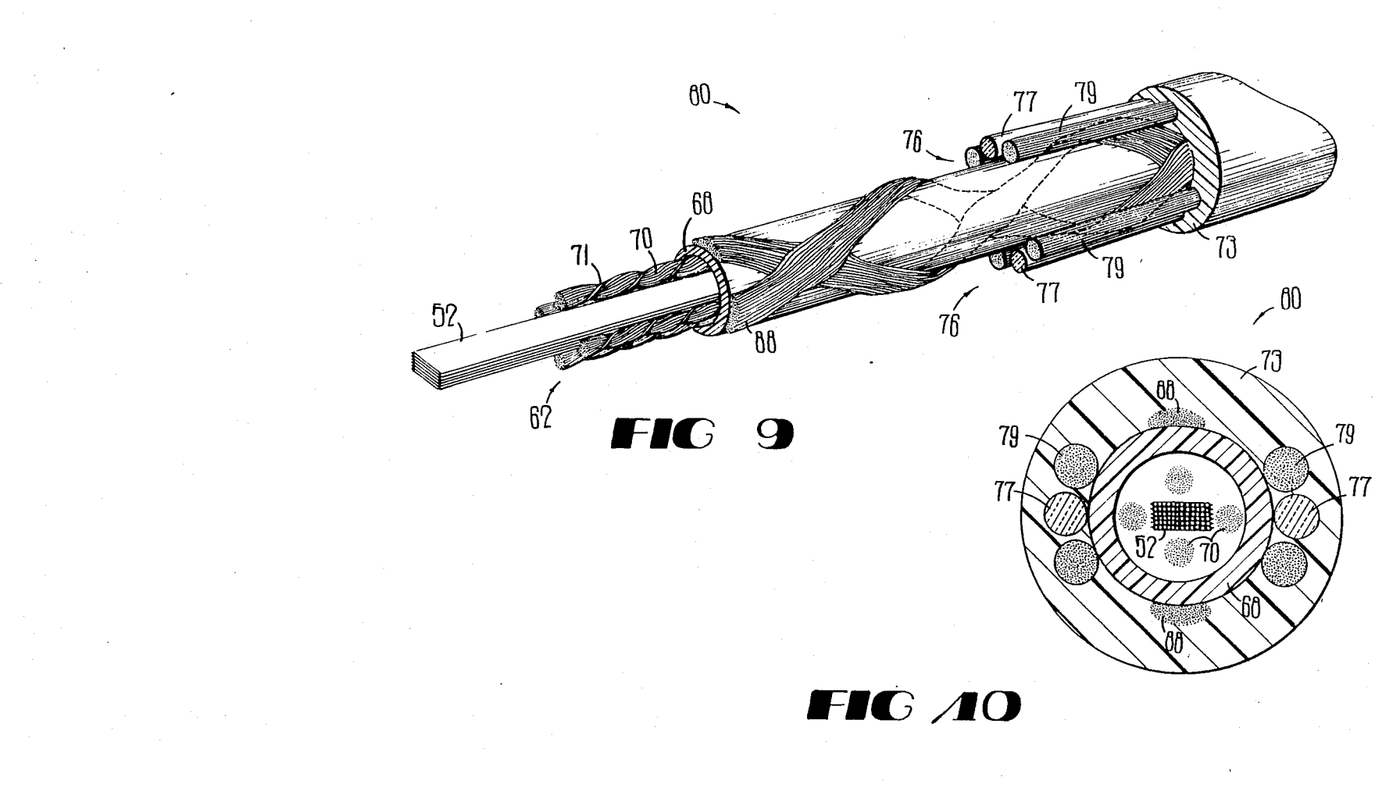
FIGS. 9-10 are perspective and end views of an alternate embodiment of the cable of FIGS. 7 and 8.

In an alternative embodiment of the cable of FIGS. 7 and 8 a cable 80 depicted in FIGS. 9–10 includes a core 62 which may include a plurality of optical fiber ribbons 52—52 such as in the cable shown in FIG. 5. The ribbons 52—52 and a plurality of water blocking yarn 70—70 are enclosed by the core tube 68. Supplementary water blocking yarn members 88—88 are disposed between the core tube 68 and the jacket 73.

The cable 80 of FIGS. 9–10 also includes a strength member system. The strength member system may include the two pluralities 76—76 each of which includes a rod-like strength member 77 and two flexible coverings 79—79. Each of the strength members is embedded substantially by the plastic jacket and may or may not engage the core tube 68.

It should also be observed that the cable 80 includes water blocking yarns disposed adjacent to the strength members and wrapped helically about the core. The yarns cross the linearly extending strength members at a plurality of locations which provides the opportunity for the yarn to intercept and swell and thereby block migration of moisture along the strength members. Or, if the strength members are wrapped helically about the longitudinal axis of the cable, the yarns may extend linearly.

The cable 20 of FIGS. 1 and 2 includes a water blocking tape which is disposed in the core. The cable of FIGS. 7–10 include water blocking yarns which are disposed in the core. It should also be noted that the core of a cable may include a water blocking tape and water blocking yarn or yarns. What is important is that the water blocking core members be provided in a manner which maintain the decoupling of the fibers from the sheath system in a direction transverse to the longitudinal axis of the cable. Also, it should be noted that if a tape is provided within the core tube, it need not be disposed concentrically contiguous with the core tube as is shown in FIGS. 1–2.

It should be realized that in the embodiments shown in FIGS. 3–6 and 9–10, the plastic material of the jacket may differ from that of the core tube. Otherwise, because only yarns are used between the two, the plastic materials if the same could have a relatively high bond therebetween depending on what is desired and depending on extrusion conditions.

Of course, it should be realized that the water blocking provisions of this invention may be included in a cable with strength member systems other than those thus far described. For example, it may be that as shown in U.S. Pat. No. 4,765,712 which issued on Aug. 23, 1988 in the names of W. D. Bohannon, Jr., et al. and which is incorporated by reference hereinto. Or the sheath system may be the well known cross-ply system which is disclosed in U.S. Pat. No. 4,241,979, which issued on Dec. 30, 1980 in the names of P. F. Gagen and M. R. Santana.

In the embodiments shown in FIGS. 3–10, as in the cable of FIG. 1, the optical fibers are substantially decoupled transversely from the sheath system. The water blocking system within the core fills only part of the area of the core tube which is not filled by the optical fibers. Also, the water blocking system within the core comprises a tape or yarn or both or a plurality of tapes or yarns which is provided so as intentionally to cause the core to include voids as opposed to some prior art systems which include yarn and tapes and which fill completely the interstitial core area around the optical fibers disposed within the core tube.

It is to be understood that the above-described arrangements are simply illustrative of the invention. Other arrangements may be devised by those skilled in the art which will embody the principles of the invention and fall within the spirit and scope thereof.

We claim:

1. A communications cable, comprising:
   a centrally disposed core which extends along a longitudinal axis of said cable and comprising at least one transmission medium;
   a core tube which defines a substantially circular area disposed generally concentrically about the longitudinal axis and which encloses said core;
   a sheath system which includes a jacket which comprises a plastic material and which encloses said core tube; and
   at least one longitudinally extending water blocking member which is disposed within said core tube to prevent the flow of water longitudinally along said core and which is such that intentional voids are provided in said core tube, said at least one transmission medium being decoupled substantially from said sheath system in at least one direction transverse of the longitudinal axis, while being coupled sufficiently to the sheath system in the longitudinal direction to cause said at least one transmission medium substantially to be moved with said sheath system when pulling forces are applied to said cable.

2. The communications cable of claim 1, wherein said core tube is such that the ratio of the sum of the cross-sectional areas of said at least one transmission medium and of the water blocking system within the core tube to the cross-sectional area within the tube does not exceed a predetermined value.

3. The communications cable of claim 1, wherein said sheath system includes a strength member system.

4. The communications cable of claim 1, wherein said core includes a plurality of optical fibers.

5. The communications cable of claim 1, wherein said water blocking system member comprises a longitudinally extending water blocking tape, said tape including a water blocking material which is swellable upon contact with water to block entry of water into said core and prevent movement of the water longitudinally along the cable.

6. The communications cable of claim 5, wherein said tape is wrapped about said transmission medium between said transmission medium and said core tube.

7. The cable of claim 5, wherein said tape has a relatively small thickness.

8. The cable of claim 5, wherein said tape is a spun-bonded polyester material which comprises continuous filament polyester fibers that are randomly arranged, highly dispersed and bonded at filament junctions.

9. The cable of claim 8, wherein said tape is impregnated with a superabsorbent material, said tape prior to being impregnated having a relatively high porosity.

10. The cable of claim 9, wherein said tape has been impregnated with a mixture which comprises water and a superabsorbent material in which the mixture comprises about 4 to 24% by weight of solids.

11. The cable of claim 10, wherein said tape has a density and the density of the impregnated tape is to about 10 to 80% greater than the density of the tape.

12. The cable of claim 10, wherein said water-blocking material is a film which includes acrylate acrylamide.

13. The cable of claim 9, wherein the relatively high porosity of said tape prior to the impregnation thereof is in the range of about 120 to 1000 cfm/ft$^2$ at 0.5 inch of water pressure head.

14. The cable of claim 9, wherein said tape has a thickness which does not exceed about 0.015 inch and a tensile strength which is at least about 5 lbs/inch of width.

15. The cable of claim 14 wherein said tape prior to impregnation thereof has a porosity in the range of about 120 to 1000 cfm/ft$^2$ at 0.5 inch of water pressure head.

16. The cable of claim 5, wherein said water blocking material is selected from the group consisting of (1) polyacrylic acid; (2) polyacrylamide; blends of (1) and (2); salts of (1) and (2); and copolymers of (1) and (2).

17. The cable of claim 5, wherein said water blocking member includes a porous laminate which comprises two longitudinally extending tapes having powder disposed therebetween, said powder caused to swell upon contact with moisture.

18. The cable of claim 1, which also includes a water blocking member which is disposed adjacent to an outer surface of said core tube.

19. The cable of claim 18, wherein said water blocking member adjacent to an outer surface of said core tube comprises a longitudinally extending tape.

20. The cable of claim 19, wherein said tape which is disposed adjacent to an outer surface of said core tube includes a porous laminate comprising two tapes having a water swellable powder disposed therebetween.

21. The cable of claim 19, wherein said tape which is disposed adjacent to an outer surface of said core tube includes a tape which has been treated with a water swellable material.

22. The cable of claim 1, wherein said water blocking member comprises at least one yarn-like material which is disposed within said core tube.

23. The cable of claim 22 wherein said yarn-like material has been treated with a water swellable material.

24. The cable of claim 23, wherein said yarn-like material is impregnated with a mixture comprising a liquid material and a water swellable material and the mixture comprises about 4 to 24% by weight of solids.

25. The cable of claim 23, wherein said water blocking material is a film which includes an acrylate polymer which includes acrylic acid and sodium acrylate.

26. The cable of claim 23, wherein said water swellable material is selected from the group consisting of (1) polyacrylic acid; (2) polyacrylamide; blends of (1) and (2) salts of (1) and (2); and copolymers of (1) and (2).

27. The cable of claim 22, which also includes a water swellable member which is disposed adjacent to an external surface of said core tube.

28. The cable of claim 27, wherein said water swellable member adjacent to an external surface of said core tube includes a water swellable tape.

29. The cable of claim 27, wherein said water swellable member adjacent to an external surface of said core tube member includes a fibrous yarn material which has been treated with a water swellable superabsorbent material.

30. The cable of claim 22, wherein said water blocking member includes a yarn comprised of superabsorbent fibrous material.

31. The cable of claim 22, wherein said yarn is compressible in at least one direction which is transverse to a longitudinal axis of the cable.

32. The cable of claim 1, wherein said water blocking member within said core includes a tape and a yarn.

33. The cable of claim 1, wherein said at least one longitudinally extending water blocking member is continuous throughout the cable.

* * * * *